(12) United States Patent
Goodnow et al.

(10) Patent No.: US 7,085,993 B2
(45) Date of Patent: Aug. 1, 2006

(54) SYSTEM AND METHOD FOR CORRECTING TIMING SIGNALS IN INTEGRATED CIRCUITS

(75) Inventors: Kenneth J. Goodnow, Essex, VT (US);
Peter J. Jenkins, Colchester, VT (US);
Francis A. Kampf, Jeffersonville, VT (US); Jason M. Norman, South Burlington, VT (US); Sebastian T. Ventrone, South Burlington, VT (US)

(73) Assignee: International Business Machine Corporation, Armonk, NY (US)

( * ) Notice: Subject to any disclaimer, the term of this patent is extended or adjusted under 35 U.S.C. 154(b) by 303 days.

(21) Appl. No.: 10/064,582

(22) Filed: Jul. 29, 2002

(65) Prior Publication Data

US 2004/0019844 A1    Jan. 29, 2004

(51) Int. Cl.
*G06F 11/08* (2006.01)
(52) U.S. Cl. .................. 714/798; 714/789; 714/814; 714/55; 713/500; 702/125
(58) Field of Classification Search .............. 714/798, 714/735, 785, 789, 744, 739, 737, 815, 814, 714/731, 707, 55, 715, 738; 327/548, 258; 368/113; 708/250; 705/35; 716/4; 235/437; 713/600, 500, 401; 710/58, 61; 709/232, 709/233; 702/125; 324/73.1; 326/16
See application file for complete search history.

(56) References Cited

U.S. PATENT DOCUMENTS

| 4,070,648 | A  | * | 1/1978  | Mergenthaler et al. ........ 714/18 |
| 5,477,181 | A  | * | 12/1995 | Li et al. ...................... 327/258 |
| 5,923,677 | A  | * | 7/1999  | Aihara ....................... 714/738 |
| 5,982,210 | A  | * | 11/1999 | Rogers ....................... 327/156 |
| 6,247,138 | B1 | * | 6/2001  | Tamura et al. .............. 713/600 |
| 6,509,788 | B1 | * | 1/2003  | Naffziger et al. ........... 327/548 |
| 6,510,398 | B1 | * | 1/2003  | Kundu et al. ............... 702/117 |
| 6,655,588 | B1 | * | 12/2003 | Fukazawa .................... 235/437 |
| 6,748,567 | B1 | * | 6/2004  | Ornes et al. ................ 714/785 |
| 6,775,809 | B1 | * | 8/2004  | Lambrecht et al. ............ 716/4 |
| 2001/0047319 | A1 | * | 11/2001 | Tada et al. .................... 705/35 |
| 2002/0107897 | A1 | * | 8/2002  | Collier ........................ 708/250 |
| 2002/0114224 | A1 | * | 8/2002  | Sasaki et al. ............... 368/113 |

\* cited by examiner

*Primary Examiner*—Guy Lamarre
*Assistant Examiner*—Dipakkumar Gandhi
(74) *Attorney, Agent, or Firm*—Scully, Scott, Murphy & Presser, P.C.; Michael J. LeStrange, Esq.

(57) ABSTRACT

A system and method for dynamically altering a clock speed of a clock signal used for timing of data signal transmissions and receptions within an integrated circuit (IC) device. The system includes a clock generator circuit for providing a clock signal used for timing of data signal transmission and reception within the IC; a monitoring circuit for receiving data transmissions generated at different clock speeds and detecting when a data transmission fail point is achieved at a particular clock speed; and, a device for adjusting the clock speed according to a maximum speed allowed for the IC that avoids the data transmission fail point.

18 Claims, 2 Drawing Sheets

SYSTEM AND METHOD FOR CORRECTING TIMING SIGNALS IN INTEGRATED CIRCUITS

BACKGROUND OF THE INVENTION

1. Field of the Invention

This invention relates generally to timing systems for integrated circuits (IC's), and more specifically, to novel circuits for altering the clock speed used to send and receive data within the IC based on physical characteristics of the IC.

2. Discussion of the Prior Art

In current integrated circuit design technology, circuits are typically designed to meet the worst case operating condition and technology process conditions. However, it is the case that typical process and operating conditions are not worst case resulting in existing margins in most worst case paths. If the design can take advantage of the real world margin, then significant performance gain could result.

It would thus be highly desirable to provide an Integrated Circuit equipped with error correction circuitry for ensuring that data send and receive rates within the IC are maximized.

It would be further highly desirable to provide an Integrated Circuit equipped with error correction circuitry for ensuring that data send and receive rates within the IC are maximized in accordance with the physical characteristics of the IC.

BRIEF SUMMARY OF THE INVENTION

It is an object of the present invention to provide circuitry in IC's to ensure maximum data send and receive rates within an IC.

It is a further object of the present invention to provide circuitry in IC's for ensuring that data send and receive rates within the IC are maximized in accordance with the physical characteristics and operating conditions of the IC.

It is another object of the present invention to provide for serial communications transmitters and receivers, a system and methodology for maximizing data send and receive rates within the IC in accordance with the physical characteristics and operating conditions of the IC.

According to the invention, there is provided at a data receiving port in an Integrated Circuit, a series of clock taps to enable clocking speed choices. At reset, a learning cycle is implemented whereby a series of predefined transmissions or a pseudo random bit stream are generated from a data transmission source. Along with the data, an error code may be included which may range from simple parity to other forms of error correction.

In a first embodiment, an ECC generator receives data from the transmitter that is clocked at various clock speeds and, outputs the data plus error correction information according to known techniques. Coupled to the ECC generator device is a novel error correcting code (ECC) check circuit device that verifies receipt of correct data transmitted until a failure point is reached. The clock frequency controlling data transmission and receive circuits is then adjusted to a maximum value that avoids the failure point.

In a second embodiment, a data error check circuit receives a sequence of data signals on error code lines that are generated at the transmitter and clocked at various clock speeds. The data sequence received at the error checker is actually delayed in time and, is compared to the known transmitted data sequence for verifying receipt of correct data transmitted until a failure point is reached. The clock frequency controlling data transmission and receive circuits is then adjusted to a maximum value that avoids the failure point. In this embodiment, wiring tools are implemented during final product development (PD) cycles to tune the load on the error codes lines in such a way that the delay though these wires will be slightly greater than the data lines to receiver circuits. During the test time, an error detection circuit will monitor to a first fail point, and then pick a click tap of sufficient guard band to guarantee the error free arrival of the data.

In a third embodiment, a random number generator is generated with any pseudo-random, linearly distributed algorithm known to skilled artisans (such as XORing the bits with themselves). This unique random number is transmitted throughout a data path of a semiconductor CORE circuit comprising various asynchronous busses or serial data streams. In this embodiment, the random data arrives at a data bus output as a data output signal, and is fed back to a comparator device that compares the data output signal with the original random number. The comparator implements logic for comparing the random data received from the CORE to the random data that was sent into the core. If the data is correct, the output of the comparator circuit will generate signals for enabling the clock frequency provided by clock generator circuit 30 to be increased in a manner so as to achieve a maximum value that avoids a failure point.

In each embodiment, once the IC chip is in a free running state, the monitoring of data will continue to ensure that the errors do not occur as the chip incurs different operating conditions. The clock rate will be accordingly adjusted.

Particularly, the clock frequency may be adjusted at a clock supply circuit in a central location and the clock would then be distributed to the source and receive logic. The clock could be sourced by a PLL or a simple oscillator and the frequency adjusted during operation using the error rate detection circuitry to increase or decrease the clock frequency. Frequency adjustment may be implemented with circuitry that changes PLL control signals or, simply by circuitry that divides the clock until the desired level of data integrity is reached. Timing of the source and receive logic can be analyzed in a best-case scenario since the clock frequency will be automatically adjusted to compensate for manufacturing process conditions and operating parameters during operation.

BRIEF DESCRIPTION OF THE SEVERAL VIEWS OF THE DRAWINGS

Further features, aspects and advantages of the apparatus and methods of the present invention will become better understood with regard to the following description, appended claims, and the accompanying drawings where:

DETAILED DESCRIPTION OF THE INVENTION

Detailed Description of the Preferred Embodiments

Figure 1:
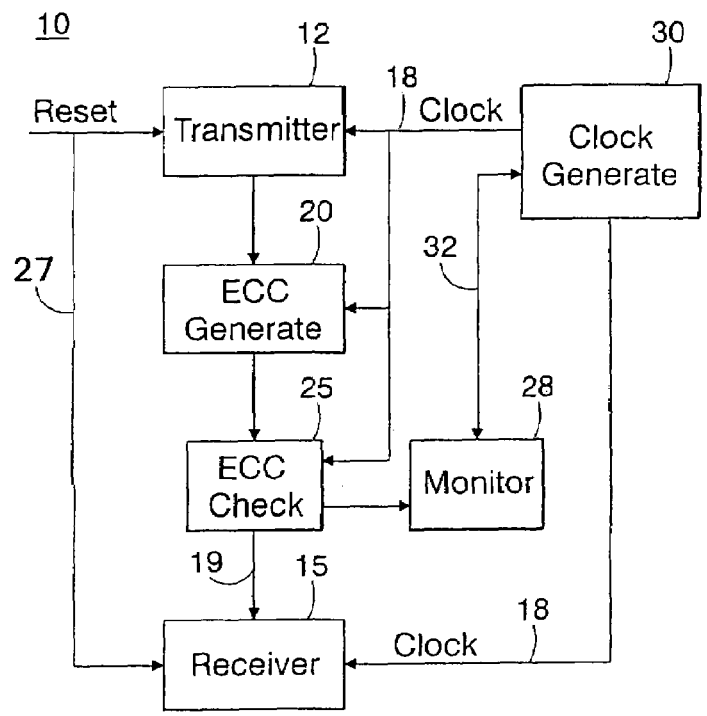
FIG. 1 is a block diagram illustrating the novel clock signal adjustment circuit implementing Error Correcting Code check according to a first embodiment of the invention.

FIG. 1 is a block diagram depicting the novel error correcting system architecture 10 according to a first embodiment of the invention. As shown in FIG. 1, there is provided a source circuit device 12 for transmitting data signals through ECC error correction circuitry 20 to a destination device such as IC receiver device 15 according to clock timing signals 18 provided by clock generator circuit 30. As shown in FIG. 1, the source transmitter circuit 12 is coupled to an error correcting code (ECC) generator circuit device 20 that generates ECC bits in accordance with the data that is received from the transmitter 12. The ECC generator 20 receives data from the transmitter 12 and, outputs the data plus error correction information according to known techniques. Coupled to the ECC generator device 20 is a novel error correcting code (ECC) check circuit device 25 which, in turn, is coupled to a destination receiver device 15 for receiving the transmitted data. As will be described in further detail herein, ECC generate 20 and ECC check 25 devices ensure the integrity of real data 19 communicated between respective transmit source and destination receive circuits 12, 15 within the IC. As shown in FIG. 1, the system architecture 10 is provided with an input reset signal 27 which when activated, triggers a system learning cycle for initializing clock timing signals so that data transmission rates may be optimized according to the characteristics of the IC.

Specifically, at reset, a learning cycle is implemented where a series of predefined transmissions or, a pseudo random bit stream, is generated from the transmit source 12. Along with the transmitted data, an error code is generated by ECC generator circuit 20 which may include simple parity to other forms of error correction, e.g., convolution (tree) or block codes. Particularly, the transmitted data and ECC error code is input to a complementary ECC check circuit 25 that determines the error check rate, e.g., how many bit errors occur in a unit of time. This error check rate is input to a monitor device 28 which functions to compare the rate of error correction against an acceptable margin. The output of the monitor device 28 is then fedback as a signal 32 to adjust the clock rate 18 for the IC and, consequently, the ECC error correction rate, until an acceptable rate of error correction is achieved. It should be understood that the error correcting system architecture 10 according to a first embodiment of the invention is used to optimize the timing clock signal 18 in real time.

Figure 2:
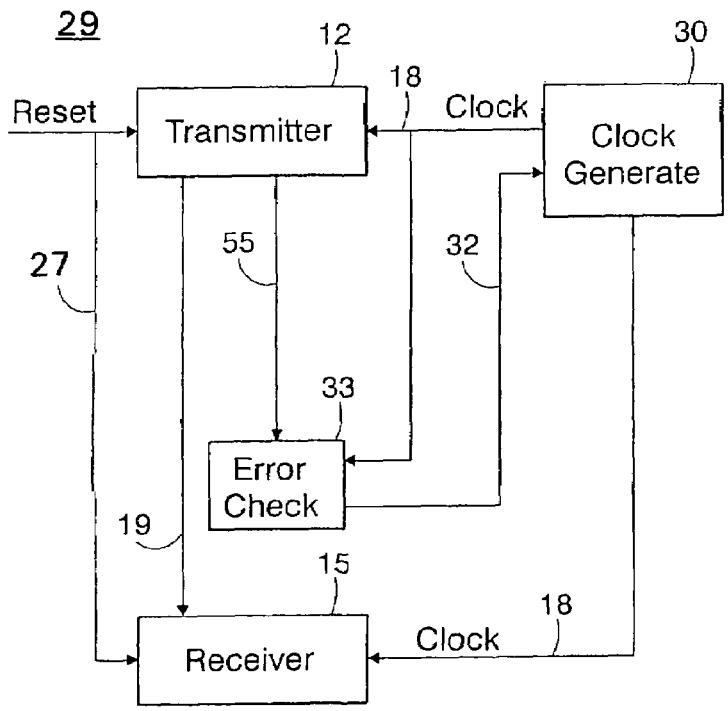
FIG. 2 is a block diagram illustrating the novel clock signal adjustment circuit implementing data error checking according to a second embodiment of the invention.

FIG. 2 is a block diagram depicting the novel error correcting system architecture 29 according to a second embodiment of the invention. As shown in FIG. 2, the transmitter, receiver and clock generator circuits are identical to the like elements depicted in FIG. 1, however, there is included a novel error check circuit 33 that checks for errors in real time. At reset, a learning cycle is implemented where a series of predefined error code transmissions or, a pseudo random bit streams, are generated from the transmit source 12 destined for error check circuit 33 over error codes lines 55. It is understood that the error code lines may comprise a single conductor or even a data bus. In accordance with this second embodiment, implementing wiring tools during the final production development phase, i.e., "PD" cycles, the load on the error codes lines 55 is fixed in such a way to provide a signal delay, as compared to data traveling over data line 19 directly from the transmitter 12 to the receiver 15. In one embodiment, the delay may be accomplished with capacitive loading, for instance of conductors 55.

Preferably, according to the second embodiment, at reset, a learning cycle is implemented where a series of predefined transmissions is generated from the transmit source 12. According to the invention, during the test time, the error check circuitry 33 (FIG. 2) will monitor to a first fail point, and then pick a clock tap of sufficient guard band to guarantee the error free arrival of the data. That is, as the error check circuit 33 is informed of the bit signal patterns output from the transmitter, it knows what signals to expect at each iteration. Thus, during the learning cycle, for each one or a series of outputs generated from the transmit source 12, the clock signal 18 is gradually increased, for example. Thus, the generated signal patterns along line 55 are sufficiently delayed so that they may be read by the error checker circuit 33. As the clock signal 18 input to the transmitter effects the timing of signals generated at the transmit source 12, the error check circuit will monitor the delayed transmitter output, and verify whether the correct data signal patterns were correctly received. As soon as a failure is detected or a failure rate that exceeds a minimum threshold is detected at the error check circuit 33, indicating an excessive clock speed 18, a signal 32 may be fed back to the clock generator circuit 30 in order to decrease the clock speed. The clock speed may be adjusted until no failures are detected at the error check circuit, or at least until failures are detected below a certain failure rate. It should be understood that, in order to insure that the error correction wires are slower than the rest of the bus, the wiring tool may introduce deliberate delay though the use of additional delay buffers and capacitance on the wires forming the error correction lines 55 which would cause the error bits to be the first to fail. The data path would still be intact and allow the data to still be transmitted while the clock generation circuit is being slowed down. In order to implement this setup, the error correction code requires it's own error correction to be able to identify that the ECC signals were the ones that were failing.

Preferably, after the reset cycle, once the chip is in a free running state, the error lines 55 may continue to be monitored by error correction circuit 33 to ensure that the errors do not occur as the chip incurs different operating conditions and, the clock rate is accordingly adjusted.

Particularly, as shown in FIGS. 1 and 2, the clock frequency of the link may be adjusted at the clock supply circuit 30 which may be centrally located, and the clock signal 18 is then distributed to the source and destination receive logic circuits. The clock may be sourced by a PLL or a simple oscillator (not shown) and the frequency adjusted during operation using the error rate detection circuitry to increase or decrease the clock frequency. Frequency adjustment may be implemented with circuitry that changes PLL control signals or, simply by dividing the clock signal by suitable circuitry until the desired level of data integrity is reached. Timing of the source and receive logic can be analyzed in a best-case scenario since the clock frequency will be automatically adjusted to compensate for manufacturing process conditions and operating parameters during operation.

More specifically, as shown in FIGS. 1–2, the ECC check and error correction circuits, while in reset mode, sends a comparison output logic signal 32 back to the originating clock source 30. This logic signal 32 is fed back to the clock generator circuit 30 along two lines to indicate that the clock frequency needs to be changed. For example, one line may indicate that a clock frequency change is needed, while the second line may indicate that a clock frequency increase "1" or decrease "0" is needed. This feedback 32 is input to the clock generation circuitry 30 which accordingly switches to the new clock frequency. A new set of test data may subsequently be sent out to attempt to establish if the clock rate was correct.

Figure 3:
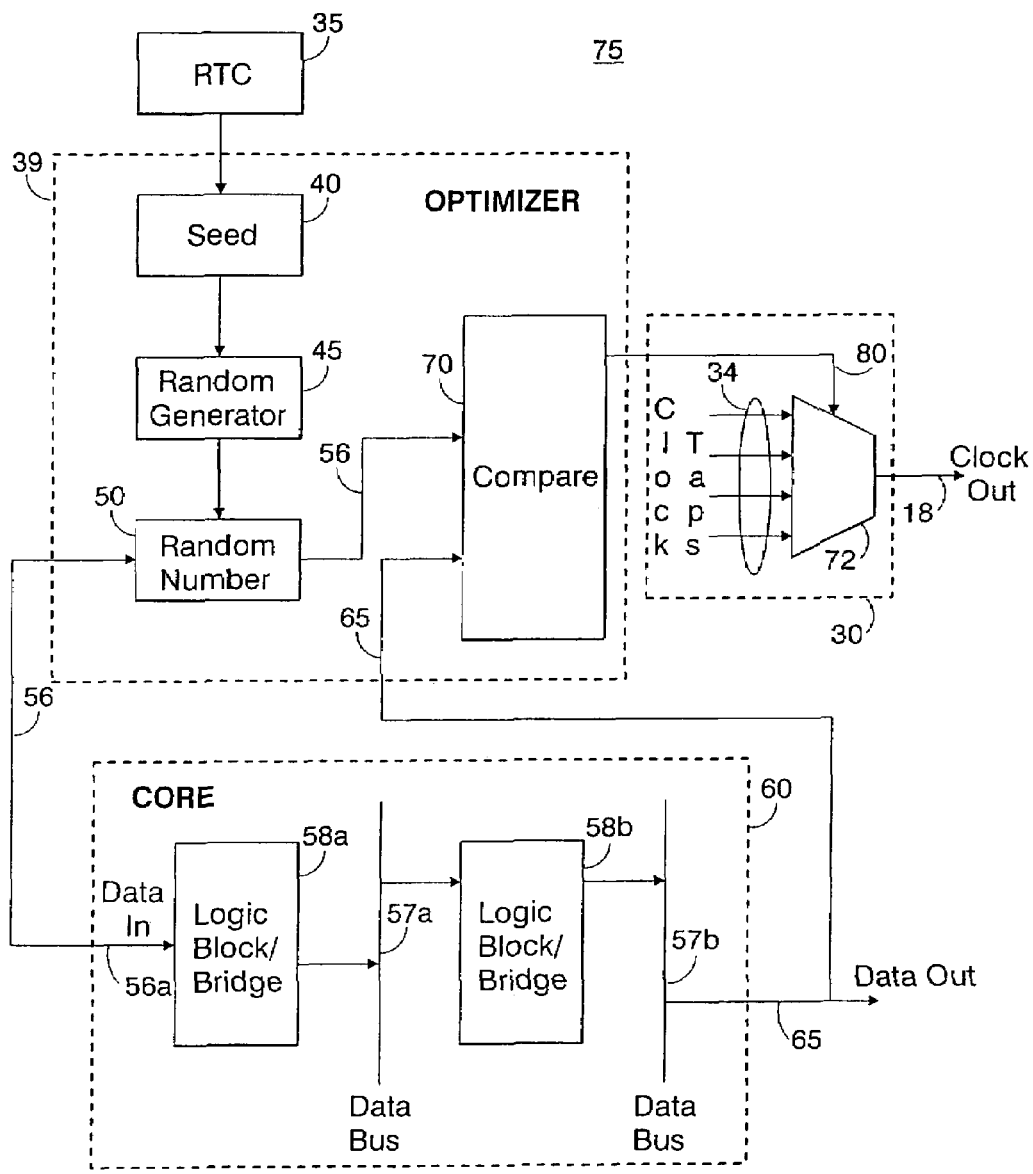
FIG. 3 is a block diagram illustrating the novel clock signal adjustment circuit implementing random number generator and IC processing according to a third embodiment of the invention.

According to a third embodiment, shown in FIG. 3, there is depicted a detailed dataflow diagram of the error generation and correction circuitry 75. In this embodiment, at system reset, the current value of the Real Time Clock (RTC) 35 is input to an optimizer circuit 39 comprising a SEED register 40 which seeds a random number generator 45. In one embodiment, a SEED is initialized, and then incremented every clock cycle. With this SEED, a unique random number 56 is generated with any pseudo-random, linearly distributed algorithm known to skilled artisans (such as XORing the bits with themselves). This unique random number 56 is transmitted throughout a data path of a semiconductor circuit, e.g., a "system on chip", also referred to as a CORE circuit 60 comprising the IC, in FIG. 3.

Particularly, this random data 56 is fed to the start of the dataflow path 56a at the input of the CORE circuit 60 and the data is transmitted through various asynchronous busses or serial data streams. In one embodiment depicted in FIG. 3, processing flow through the CORE circuit 60 includes devices such as data busses 57a, 57b and various logic block/bridges 58a, 58b to the output. Finally, the random data arrives at a data bus output 57b as data output signal 65, and is returned back to the comparator device 70 provided in the optimizer 39. In the optimizer 39, the original random data 56 is input to the error detecting comparator device 70 implementing logic for comparing the random data 65 received from the CORE 60 to the random data 56 that was sent into the core 60. If the data is correct, the output of the comparator circuit 70 will generate signals 80 for enabling the clock frequency provided by clock generator circuit 30 to be increased. That is, if the system on chip (SOC) is operating at an operable frequency and no data errors occur, then the data 65 received will match the data 56 that what was sent and the clock frequency may be increased. If the data does not match, then the system clock 30 is running too fast and the frequency must be decreased. That is, if any errors are found as a result of the comparison, the clock taps 34 provided in clock generator circuit 30 may be increased to step down the clock frequency. Thus, as shown in FIG. 3, the frequency of clock signal 30 is chosen from several clock taps via a multiplexor 72.

In the preferred embodiment, the entire processes depicted in FIGS. 1–3 is repeated frequently with a new set of test data in an attempt to establish if the clock rate is correct. The processes depicted in FIGS. 1–3 may additionally be repeated during normal device operation to ensure that the errors do not occur as the chip incurs different operating conditions.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A system for dynamically optimizing a clock speed of a clock signal used for timing of data signal transmissions and receptions within an integrated circuit (IC) device comprising:

a transmitter means for successively transmitting data signals for receipt by a receiver device within said IC;

a clock generator circuit for providing a clock timing signal to respective said transmitter means and said receiver device, said clock timing signal used for timing said data signal transmission and reception within said IC at successively different clock speeds, each said successive data signal transmission transmitted at a different clock speed;

a monitoring circuit means for receiving successive data signal transmissions generated at different clock speeds and detecting when a data signal transmission fail point is achieved at a particular clock speed; and, means for adjusting said clock timing signal provided to respective said transmitter means and said receiver device at each clock speed, said means adjusting said clock timing signal to achieve a maximum speed allowed for the IC that avoids said data transmission fail point during real-time operation.

2. The system as claimed in claim 1, wherein said means for adjusting comprises means for generating a feedback control signal for input to said clock generator circuit for adjusting said clock to said maximum speed.

3. The system as claimed in claim 2, further comprising:

a random data generating circuit for generating unique random data signals for transmission throughout a data path of a circuit within said IC device, said circuit for processing said random data signals and generating a corresponding data output;

said monitoring circuit including a means for comparing said generated random data against said corresponding data output of said processing circuit, wherein a data transmission fail point corresponds to a clock speed resulting in an error between said generated random data and said corresponding processing circuit output.

4. The system as claimed in claim 3, wherein said random data generating circuit includes a random number generator for receiving a seed value and generating said unique random data therefrom.

5. The system as claimed in claim 3, wherein said comparator means generates said feedback control signal indicating said data output of said processing circuit matches said generated random data, said feedback control signal being input to said clock generator circuit for enabling the clock frequency provided by clock generator circuit to be increased.

6. The system as claimed in claim 3, wherein said comparator means generates said feedback control signal indicating said data output of said processing circuit does not match said generated random data, said feedback control signal being input to said clock generator circuit for enabling the clock frequency provided by clock generator circuit to be decreased.

7. The system as claimed in claim 2, further comprising:

an error correction code signal generating circuit for generating error correction code signals according to each data signal transmission, said monitoring circuit comprising an error correction code signal check circuit for receiving said error correction code signals and comparing error correction signals generated at each clock speed against known error corrections corresponding to each data signal transmission, wherein said data transmission fail point corresponds to a clock speed resulting in an error between said error correction code signals and said corresponding known error correction codes.

8. The system as claimed in claim 2, further comprising:
a means for delaying each of a series of data transmission signals generated at different clock speeds;
said monitoring circuit comprising an error check circuit for receiving each of said series of delayed data transmission signals and comparing each delayed data transmission signal against a corresponding known data signal transmission, wherein a data transmission fail point corresponds to a clock speed resulting in an error between said delayed data transmission signal and said corresponding known data transmission.

9. The system as claimed in claim 8, wherein said means for delaying each of a series of data transmission signals comprises means for increasing a load applied to data lines carrying said data transmission signals to said error check circuit.

10. The system as claimed in claim 1, wherein said clock generator circuit comprises
a multiplexor device comprising one or more clock taps responsive to said feedback control signal for enabling alteration of said clock speed.

11. A method for dynamically optimizing a system clock speed of a clock signal used for timing of data signal transmission and receptions in an Integrated Circuit (IC), said method comprising the steps of:
a) successively transmitting data signals by a transmitter means for receipt by a receiver device within said IC,
b) providing said clock timing signal to respective said transmitter means and said receiver device, said clock timing signal used for timing of data signal transmission and reception within said IC at successively different clock speeds
c) receiving successive data transmissions generated at different clock speeds and detecting when a data signal transmission fail point is achieved at a particular clock speed; and,
d) adjusting said clock timing signal provided to respective said transmitter means and said receiver device at each clock speed, said clock timing signal adjusted to achieve a maximum speed allowed for the IC that avoids said data transmission fail point during real-time operation.

12. The method as claimed in claim 11, wherein said adjusting step d) includes the step of generating a feedback control signal for input to said clock generator circuit, said feedback signal for adjusting said clock to said maximum speed.

13. The method as claimed in claim 12, further comprising the steps of:
generating error correction code signals according to each data signal transmission,
receiving said error correction code signals and comparing error correction signals generated at each clock speed against known error correction codes corresponding to each data transmission, wherein a data transmission fail point corresponds to a clock speed resulting in an error between said error correction signals and said corresponding known error correction codes.

14. The method as claimed in claim 12, further comprising the steps of:
delaying each of a series of data transmission signals generated at different clock speeds;
receiving each of said series of delayed data transmission signals and comparing each delayed data transmission signal against its corresponding known data signal transmission, wherein a data transmission fail point corresponds to a clock speed resulting in an error between said delayed data transmission signal and said corresponding known data transmission.

15. The method as claimed in claim 14, wherein said delaying step includes the step of increasing a load applied to data lines carrying said data transmission signals to said error check circuit.

16. The method as claimed in claim 12, wherein said feedback control signal includes a first signal indicating a match between said data output signal of said data path and said generated unique random data, or generating a second output signal indicating no match between said data output signal of said data path and said generated unique random data, wherein said adjusting step d) includes responding to either said first or second output signals for respectively increasing or decreasing a clock frequency of said clock signal.

17. The method as claimed in claim 12, further comprising the steps of:
generating unique random data transmission signals;
transmitting said unique random data signals throughout a data path of a circuit within said IC device for processing therein, and generating a corresponding data output signal; and,
comparing said generated random data against said corresponding data output of said processing circuit, wherein a data transmission fail point corresponds to a clock speed resulting in an error between said generated random data and said corresponding processing circuit output.

18. The method as claimed in claim 12, further including the step of continuously detecting presence of data transmission fail points to ensure that the errors do not occur as the IC incurs different operating conditions, said monitoring including adjusting the clock speed accordingly.

* * * * *